July 19, 1927. 1,636,411
L. T. FREDERICK
COMPOSITE GEAR AND METHOD OF MAKING SAME
Filed Aug. 26, 1925 2 Sheets-Sheet 2
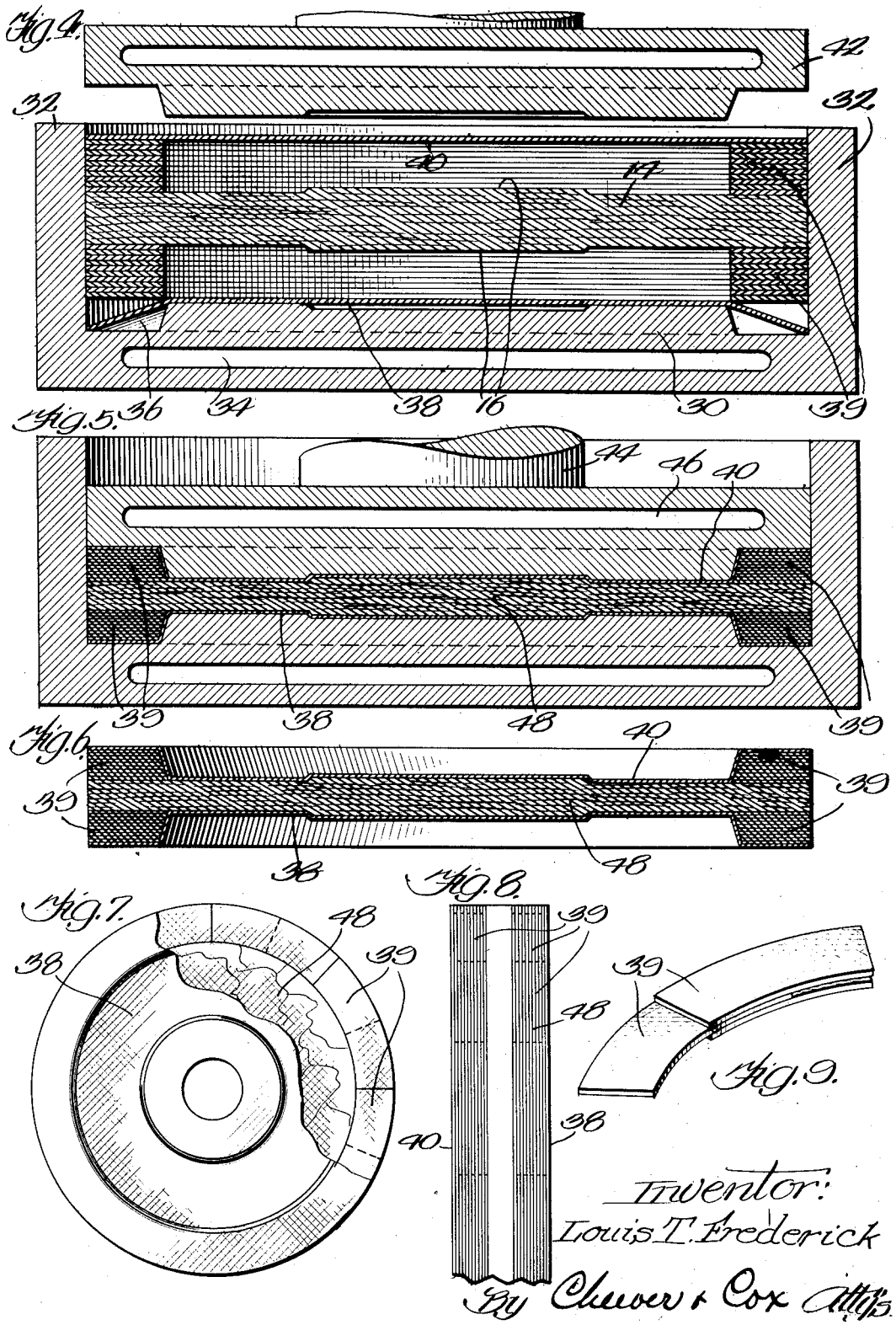

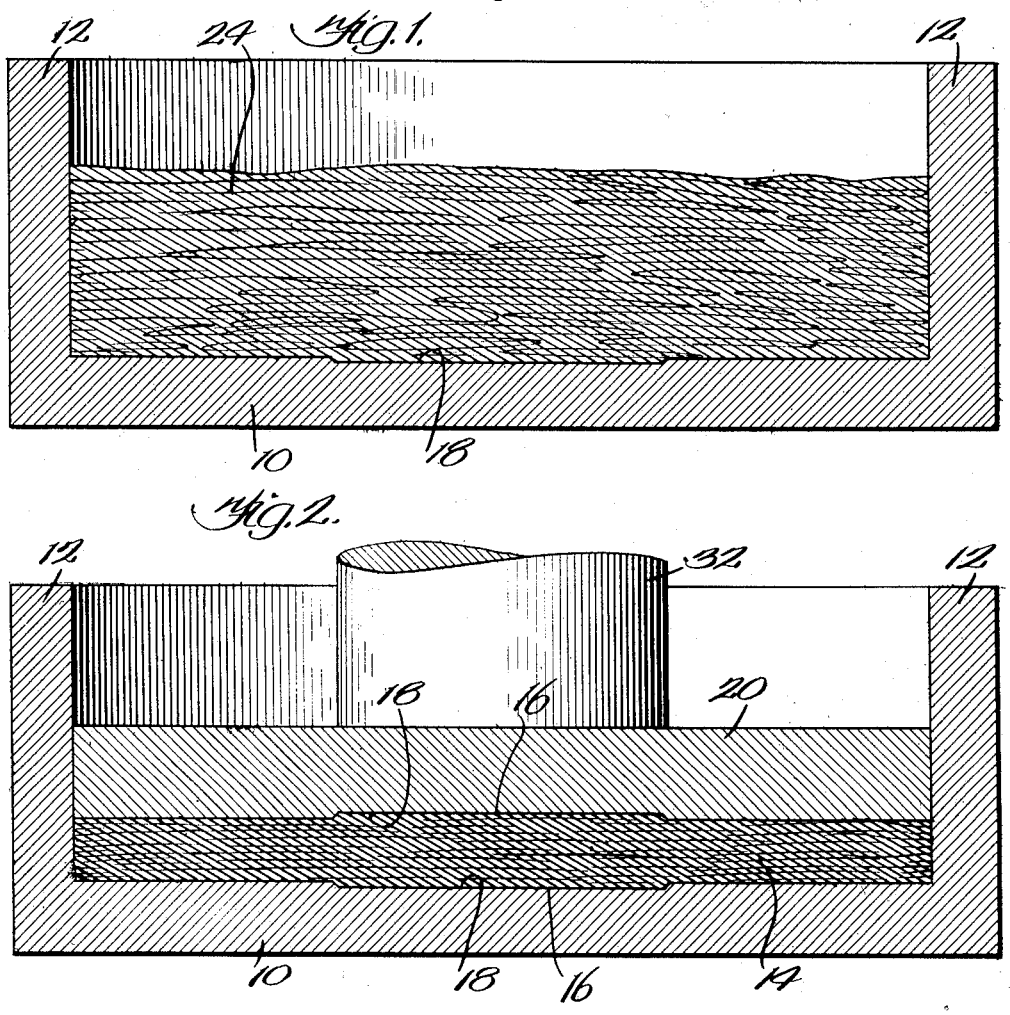

Patented July 19, 1927.

1,636,411

UNITED STATES PATENT OFFICE.

LOUIS T. FREDERICK, OF VALPARAISO, INDIANA, ASSIGNOR TO FIBROC INSULATION COMPANY, OF VALPARAISO, INDIANA, A CORPORATION OF INDIANA.

COMPOSITE GEAR AND METHOD OF MAKING SAME.

Application filed August 26, 1925. Serial No. 52,710.

My invention relates to composite gear blanks and the like and methods of making same, and the object of the invention is to expedite the manufacture of such articles, to reduce the cost thereof, and to reduce the number which on the average would be rejected if made according to previously known methods of manufacture. It is common to produce gear blanks from woven fabric impregnated with phenolic condensation product, which for simplicity I shall refer to generically as "bakelite". One known way to make such gear blanks is to first impregnate with the liquid bakelite sheets of duck or other fabric, then dry the sheets, cut them into discs, superpose a plurality of these discs in a hot press and then consolidate them into a hard, unitary mass by curing the bakelite under heat and pressure. In proceeding according to this method a considerable amount of scrap material is produced. Methods have been devised for utilizing this scrap in gear blanks by introducing the scraps into the hot press, usually in association with complete discs or rings of the impregnated sheets. These methods have certain disadvantages, for instance, after the scrap material is introduced into the hot press and the press starts to operate there is no opportunity for inspection, and if the workman is careless in distributing the scrap material in the press a gear blank is produced whose density varies at different points. One of the objects of my invention is to provide a process which will admit of inspection during the period in which the process is taking place. Another disadvantage of the old methods of utilizing scrap is that too great a period of time is occupied in charging the press. The presses are necessarily substantial in construction and hence expensive, and they occupy considerable space in the factory. Consequently anything that will increase the output of the press will proportionately decrease the cost of manufacture and one of the objects of my invention is to reduce the time necessary for charging the press.

Another object of the invention is to reduce the amount of waste. According to the old method if a gear blank upon being removed from the hot press was imperfect, it represented practically a total loss because the bakelite has been cured, and it is one of the characteristics of bakelite that after it has been cured it is infusible and cannot be reworked. One of my purposes is to afford an opportunity for inspection while the bakelite is still in condition to be reworked if necessary.

Briefly, according to my new method I preform the body of the blank in the sense that I arrange the scrap material in a preforming cold press and then subject the material to sufficient pressure to form a cake or self-supporting body without curing the bakelite. The article may then be inspected and if found defective can be disintegrated and the material used over again. The preformed body is then introduced into a hot press either alone or with rings, discs or sectors for producing the desired form of blank.

In order to more clearly understand the invention reference may be had to the accompanying drawings which are largely diagrammatic and in which Figure 1 is a vertical sectional view of the receptacle of the cold press showing some of the loose scrap material within it.

Figure 2 is similar to Figure 1 but shows in addition the plunger in the position it will occupy after the material has been preformed.

Figure 3 is a perspective view partly broken away showing the preformed body.

Figure 4 is a vertical sectional view of a hot press showing the receptacle with the component materials grouped within it and the plunger about to descend.

Figure 5 is similar to Figure 4, but shows the condition after the plunger has descended.

Figure 6 is a diametrical sectional view of the completed blank.

Figure 7 is a face view partly broken away showing one structural arrangement of the annular sectors.

Figure 8 is an edge view of the gear blank shown in Figure 7.

Figure 9 is a fragmentary perspective showing the manner of laying up the rim sectors according to the arrangement shown in Figures 7 and 8.

Like numerals denote like parts throughout the several views.

Ordinarily the scrap material will be prepared for my process either by adding a sufficient amount of solvent to soften the uncured bakelite or adding a small quantity of the liquid bakelite to the scrap material to moisten it slightly and enable the pieces to cohere. The pieces of scrap material should not be too large, as large pieces cannot be so well distributed and consequently it is desirable to pass the material through a chopping machine or grinder preparatory to the moistening process. After the scrap material has been thus chopped up or otherwise reduced to compartively small fragments and has been moistened, the proper quantity for a gear blank is measured out, usually by weighing, and the material is then ready to be introduced into the cold press.

In the drawings, the receptacle of the cold press has a bottom 10 and side walls 12. Gear blanks are usually circular, and consequently the walls 12 will usually be cylindrical. If it is desired that the preformed body 14 have a hub portion 16, the bottom of the receptacle will be recessed at the center as shown at 18. A plunger 20 fits slidingly within the receptacle and is actuated by a plunger stem 32 or other suitable operating element. The bottom surface of the plunger 20 may also have a recess 18 for the formation of a hub 16.

The scrap material 24 is introduced in proper quantity into the receptacle of the press, after which the plunger 20 is caused to descend and exert enough pressure to form the material into a cake or self-supporting body which may be handled as a unit.

After the preformed body is removed from the press it is usually put in the dryer to remove the solvent employed in the moistening process.

After the body is thus preformed it is introduced into the hot press, which is illustrated diagrammatically in Figures 4 and 5. This press has a bottom 30 and side walls 32, the latter usually being cylindrical and of a diameter equal to the diameter of the finished blank. It is heated by means of steam introduced into a steam chamber 34, or by any other appropriate means.

If the final gear blank is to be merely a flat or substantially flat disc, no further assemblage is necessary and the preformed body 14 may be introduced into the hot press and there cured under heat and pressure in the well-known manner. However, it is common to require that gear blanks have a rim thicker than the web or body of the gear and for the purpose of illustrating the manufacture of a gear of such type I have shown in Figure 4 one manner of assembling the parts when it is desired to produce a gear blank with a thickened rim and finished appearance on the surface. An annular recess 36 is formed in the upper surface of the bottom of the hot press and a disc 38 of bakelite-treated fabric is laid on the bottom of the receptacle. Then a number of ring sectors 39 are laid up next to the wall in staggered relation illustrated in perspective in Figure 9. Of course complete rings of impregnated fabric may be employed but it is cheaper to employ ring sectors and in order to break joints it is desirable that these sectors be laid up with overlapping ends in the manner illustrated.

After a pile of these sectors has been laid up to the sufficient amount, the preformed disc 14 is laid upon them after which a similar annular pile of sectors is laid above the disc as shown in Figure 4. Over this pile may be laid a finishing disc 40 of bakelite-treated fabric similar to the disc 39. The plunger 42 is then forced to descend onto the materials within the receptacle 32 and it compresses them into the shape shown in Figures 5 and 6. The upper plunger is actuated by a stem 44 or other appropriate actuating element and is heated by steam in a chamber 46 or in any other suitable manner. The materials are left in the hot press for a sufficient period to cure the bakelite in the well-known manner. The completed article 48 is then removed from the press and is ready to have the gear teeth cut in it in accordance with usual practice.

It will be evident that by proceeding in the manner described an opportunity is afforded for inspecting the partially formed blank. If it shows unequal distribution of material or is otherwise defective it may be returned to the chopping machine and used over again because the bakelite will not have been cured and hence will not have lost its original uncured character. Furthermore the time required for charging the hot press will be reduced because as is obvious it takes less time to introduce a single unit into the hot press than to take the time for introducing loose material and then seeing that it is uniformly distributed. Furthermore the preformed disc is easier to handle than loose material would be, and hence the elements assembled in the hot press are more apt to be correctly assembled, thus reducing the number of defective articles that might otherwise be produced. The output of the press is also increased, and the method of manufacture is simplified in the sense that less skill and care is required for practicing it, and a waste of material is avoided for it can be inspected at an intermediate point in the process when it can still be reworked instead of waiting until it has reached a condition which would prevent it from being reworked.

Having thus described my invention what I claim as new and desire to secure by Letters Patent is:

1. The process of making gear blanks consisting in taking small particles of substantially dry, fibrous material impregnated with an uncured binder, pressing it into a self-sustaining element of the full diameter of the gear blank, the pressure and temperature being insufficient to cure the binder, releasing the pressure to admit of inspection, and subsequently submitting the article to sufficient heat and pressure to cure the binder.

2. The method of making gear blanks consisting in taking small, substantially dry, chopped up pieces of fabric impregnated with uncured binder, pressing these particles into a self-sustaining element of the full diameter of the gear blank, keeping the temperature and pressure low enough to prevent the binder from becoming cured, and forming a hub portion by placing upon the outside of the preformed element layers of fabric impregnated with binder, and then subjecting the whole to heat and pressure sufficient to consolidate the mass and cure the binder.

3. The herein described method of producing gear blanks consisting in preforming a body element of the full diameter of the gear blank, the same being composed of small, substantially dry particles of fibrous material impregnated with a phenol condensation product binder in unreacted condition, and subsequently arranging annular layers of woven fabric to form a rim portion, said layers being impregnated with similar binder in unreacted condition and being substantially dry and being superposed upon the body element and upon each other, and finally subjecting the whole to sufficient heat and pressure to react and condense the binder.

4. The method of making composite articles consisting in taking particles of fibrous material in dry form impregnated with uncured bakelite, moistening them with a fluid containing a solvent of bakelite, subjecting the mass to a pressure and temperature insufficient to cure the bakelite but to cause the particles to cohere, releasing the pressure and finally subjecting the article thus formed to heat and pressure sufficient to further consolidate the mass and cure the bakelite.

5. The method of making composite articles consisting in taking particles of fibrous material in dry form impregnated with uncured bakelite, moistening them with a fluid containing a solvent of bakelite, subjecting the mass to a pressure and temperature insufficient to cure the bakelite but to cause the particles to cohere, releasing the pressure, driving off the solvent and finally subjecting the dried formed article to heat and pressure sufficient to further consolidate the mass and cure the bakelite.

6. A composite gear blank having the entire body portion composed of scraps of fibrous material treated with bakelite and without definite arrangement and having raised portions in annular form at the center and rim composed of sheets of woven fabric treated with bakelite and superposed upon the body portion and each other, the whole being consolidated into a hard, unitary mass in which the bakelite is in cured condition.

7. A gear blank having a body composed of chopped up, fibrous material and a cured reaction product binder, said body extending from the central portion to the circumference, and a thickened peripheral portion which is laminated and composed of layers of fabric impregnated with similar binder in similar condition, said layers being superposed upon the body portion.

8. A gear blank having a body composed of chopped up, fibrous material and a cured reaction product binder, said body extending from the central portion to the circumference, and a thickened central portion forming a hub which is laminated and composed of layers of fabric impregnated with similar binder in similar condition, said layers being superposed upon the body portion.

9. A gear blank having a body composed of chopped up, fibrous material and a cured reaction product binder, said body extending from the central portion to the circumference of the gear blank, and thickened portions at the center and at the periphery, the thickened portions being composed of layers of fabric impregnated with similar binder in similar condition, the layers being superposed upon the body portion and being of substantially the same thickness on both sides of the body portion.

In witness whereof, I have hereunto subscribed my name.

LOUIS T. FREDERICK.